United States Patent
Jain et al.

(10) Patent No.: US 10,469,402 B2
(45) Date of Patent: Nov. 5, 2019

(54) DYNAMIC ENDPOINT GROUP BINDING FOR CROSS-TENANT RESOURCE SHARING IN SOFTWARE DEFINED NETWORKS

(71) Applicant: Cisco Technology, Inc., San Jose, CA (US)

(72) Inventors: Saurabh Jain, Fremont, CA (US); Vijay K. Chander, San Ramon, CA (US); Vijayan Ramakrishnan, Milpitas, CA (US); Ronak K. Desai, Fremont, CA (US); Praveen Jain, Cupertino, CA (US); Munish Mehta, Fremont, CA (US); Yibin Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 15/353,093

(22) Filed: Nov. 16, 2016

(65) Prior Publication Data

US 2018/0139150 A1    May 17, 2018

(51) Int. Cl.
G06F 15/167    (2006.01)
H04L 12/919    (2013.01)
H04L 12/24    (2006.01)

(52) U.S. Cl.
CPC ........ *H04L 47/765* (2013.01); *H04L 41/0823* (2013.01); *H04L 41/0896* (2013.01); *H04L 41/12* (2013.01)

(58) Field of Classification Search
CPC ...... H04L 45/22; H04L 45/306; H04L 47/765

USPC ......................................... 709/223, 224, 226
See application file for complete search history.

(56) References Cited

U.S. PATENT DOCUMENTS 9,397,946 B1 * 7/2016 Yadav ................. H04L 41/0806
2014/0380425 A1 * 12/2014 Lockett ................... H04L 63/20
                                                                    726/4
2015/0124590 A1    5/2015 Chu et al.
(Continued)

OTHER PUBLICATIONS

Cisco, "Cisco Application Centric Infrastructure Fundamentals," Aug. 23, 2016, 288 pages.

*Primary Examiner* — Wing F Chan
*Assistant Examiner* — Andrew Woo
(74) *Attorney, Agent, or Firm* — Edell, Shapiro & Finnan, LLC (57) ABSTRACT

The techniques presented herein use dynamic endpoint group (EPG) binding changes to facilitate cross-tenant resource sharing. A first node of a multi-tenant software defined network determines that an application on a first endpoint has initiated operation and needs temporary access to resources located at a second endpoint. The first and second endpoints are associated with first and second tenants, respectively, that are logically segregated from one another by the software defined network. The first node dynamically changes an initial EPG binding associated with the first endpoint to a second EPG binding that enables the first endpoint to temporarily directly access the resources at the second endpoint. The first node subsequently determines that the application on the first endpoint no longer needs access to the resources located at a second endpoint and, as such, changes the second EPG binding associated with the first endpoint back to the initial EPG binding.

20 Claims, 4 Drawing Sheets

(56) References Cited

U.S. PATENT DOCUMENTS

2015/0127701 A1 5/2015 Chu et al.
2016/0211988 A1 7/2016 Lucas et al.

* cited by examiner

FIG.1

| ENDPOINT | EPG BINDING | |
|---|---|---|
| | ENDPOINT BINDING | BRIDGE DOMAIN BINDING |
| HOST 30(1) | HOST 30(1) TO EPG-1 | EPG-1 TO BDb |
| HOST 30(2) | HOST 30(2) TO EPG-2 | EPG-2 TO BDy |
| INFRASTRUCTURE SERVER 30(3) | HOST 30(3) TO EPG-3 | EPG-3 TO BDg |

FIG.4

DYNAMIC ENDPOINT GROUP BINDING FOR CROSS-TENANT RESOURCE SHARING IN SOFTWARE DEFINED NETWORKS

TECHNICAL FIELD

The present disclosure relates to sharing resources in a software defined network.

BACKGROUND

Software defined networking presents a standards based control and data plane solution for building the next generation data centers. For example, the Application Centric Infrastructure provided by Cisco® is a software defined networking solution designed to automate, configure, and manage data center fabrics, and has become popular in enterprise data center environments. Cisco is a registered trademark of Cisco Technology, Inc.

In certain cases, a data center may serve different tenants (i.e., multiple different organizations, separate entities within an organization, etc.). Such data centers, sometimes referred to as multi-tenant data centers, provide logical separation/segregation between each of the different tenants, as well as security, scalability, and per-tenant services, all of which are designed to simplify management and orchestration. As the use of virtualization within data centers expands, security and management are becoming increasingly important.

DESCRIPTION OF EXAMPLE EMBODIMENTS

Overview

Presented herein are techniques that use dynamic endpoint group (EPG) binding changes (e.g., either changes to an EPG-to-BD binding or changes to an endpoint-to-EPG binding) to facilitate cross-tenant resource sharing. For example, a first node of a multi-tenant software defined network determines that an application on a first endpoint has initiated operation and that the application needs temporary access to resources located at a second endpoint. The first and second endpoints are associated with first and second tenants, respectively, that are logically segregated from one another by the software defined network. The first node dynamically changes an initial EPG binding associated with the first endpoint to a second EPG binding that enables the first endpoint to temporarily directly access the resources at the second endpoint. The first node subsequently determines that the application on the first endpoint no longer needs access to the resources located at a second endpoint and, as such, changes the second EPG binding associated with the first endpoint back to the initial EPG binding so that first endpoint can no longer directly access the resources at the second endpoint. The binding changes can be triggered by either traffic inspection or orchestration.

Detailed Description

Certain software defined networking technologies, such as the Application Centric Infrastructures provided by Cisco®, provide application policy-based solutions through scalable distributed enforcement. Such software defined networking technologies generally support integration of physical and virtual environments under one declarative policy model for networks, servers, services, and security. A component of these software defined networking technologies is the concept of a collection of endpoints/hosts that share common policy requirements, such as security, Quality of Service (QoS), services, etc. A collection of endpoints that share common policy requirements is sometimes referred to herein as an "Endpoint Group" (EPG). A software defined network (SDN) can include multiple EPGs that each include one or more endpoints.

A software defined network that includes one or more EPGs also makes use of the concept of "EPG bindings" for a given endpoint. As used herein, each endpoint attached to a software defined network includes an associated EPG binding. The EPG binding includes or is formed by two sub-bindings, referred to herein as an EPG-to-endpoint binding (i.e., an "endpoint binding") and an EPG-to-bridge domain binding (i.e., a "bridge domain binding"). An endpoint binding is a mechanism to classify traffic to/from an endpoint (i.e., endpoint traffic) into a specific EPG of a software defined network. The classification of endpoint traffic can be based on, for example, a network segment identifier such as Virtual Local Area Network (VLAN) ID, a Virtual Extensible LAN (VXLAN) identifier, a Network Virtualization using Generic Routing Encapsulation (NVGRE) Virtual Subnet Identifier (VSID), etc. In addition, the classification can also be based on an endpoint's Media Access Control (MAC) or Internet Protocol (IP) address. EPGs that use MAC or IP addresses for classification are referred to herein as MAC microsegmentation EPGs or IP microsegmentation EPGs, respectively.

A bridge domain (BD) is a broadcast domain created for certain software defined networks. In general, endpoints within a bridge domain can communicate freely with each other. Bridge domains can include multiple EPGs and endpoints within a bridge domain, but in different EPGs, can communicate with each other when there is a defined contract between the EPGs to communicate. A bridge domain binding, which as noted above forms part of an EPG binding associated with an endpoint, is a mechanism to determine how to forward EPG traffic in a network fabric. The bridge domain binding is achieved through configuration of a relationship from an EPG to a bridge domain. For the purpose of tenant isolation/segregation, an EPG belonging to a tenant should be bound to the bridge domain of that same tenant (i.e., each EPG maps to only one bridge domain). As noted, each bridge domain can include multiple EPGs.

Figure 1:
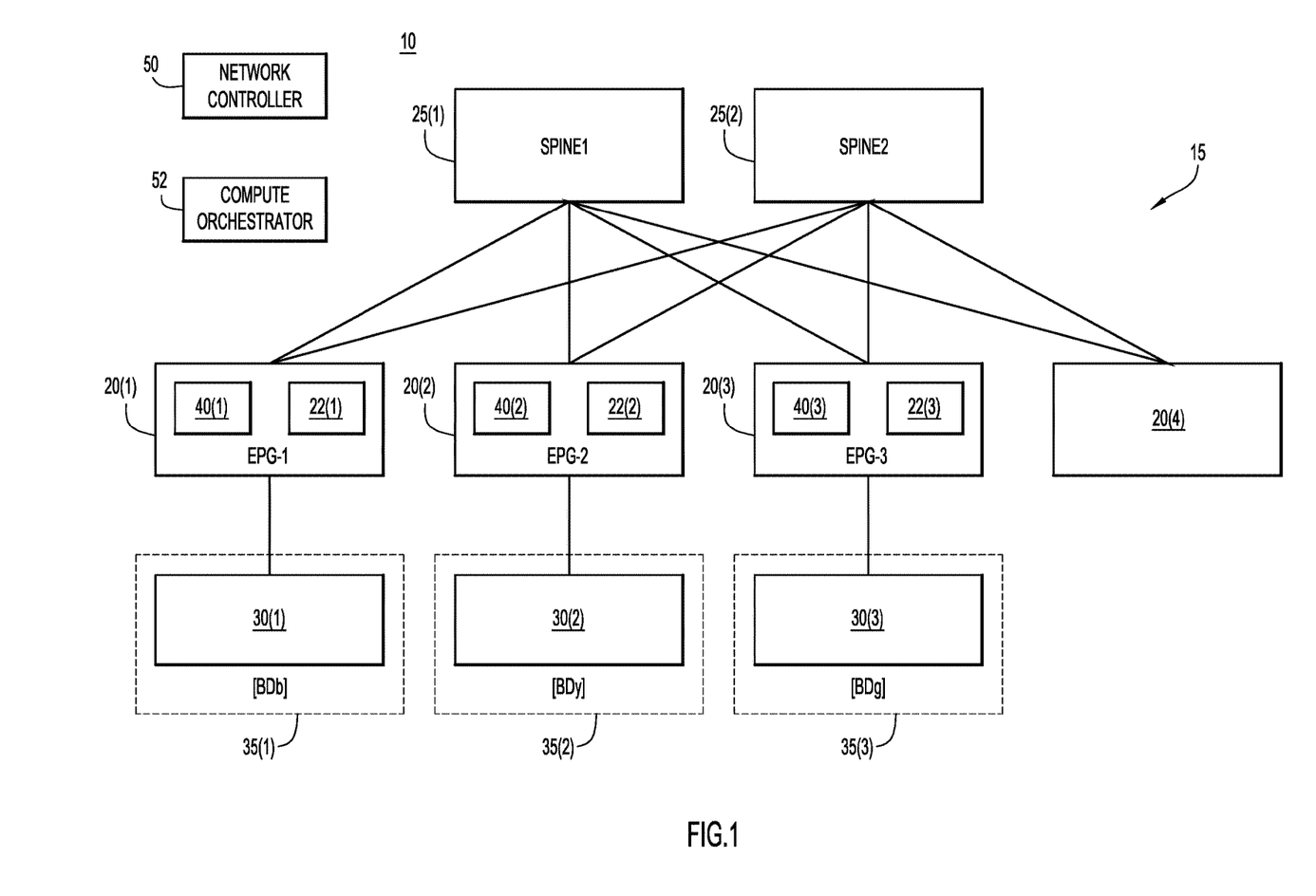
FIG. 1 is a block diagram of a network environment configured to implement endpoint group (EPG) binding adaption techniques, according to an example embodiment.

FIG. 1 is a schematic diagram of a software defined network deployment in a multi-tenant data center 10 in accordance with examples presented herein. As described further below, the multi-tenant data center 10 of FIG. 1 is configured for dynamic EPG binding changes to enable cross-tenant resource sharing.

The data center 10 includes a network fabric 15 having a set of interconnected networking devices/nodes in a leaf and spine architecture (e.g., CLOS network topology). More specifically, the network fabric 15 comprises a plurality of leaf nodes (e.g., leaf switches) 20(1)-20(4) and a plurality of spine nodes (e.g., spine switches) 25(1)-25(2). In the example of FIG. 1, the leaf nodes 20(1), 20(2), and 20(3) include EPG binding adaption modules 22(1), 22(2), and 22(3), respectively. As described further below, the EPG binding adaption modules 22(1), 22(2), and 22(3) are configured to dynamically change EPG bindings associated with an endpoint in accordance with the examples presented herein. Leaf node 20(4) is a border node for the network fabric 15 (i.e., connects the network fabric to an external network, such as the Internet).

In general, a leaf and spine architecture, such as that shown in FIG. 1, creates a low-latency, scalable network fabric. However, it is to be appreciated that the leaf and spine architecture of FIG. 1 is merely an example of a network architecture in which the techniques described herein may be implemented.

The network fabric 15 may be, for example, an Internet Protocol (IP) local area network (LAN). The network fabric 15 may also include or support one or more overlay/encapsulated networks that support the multi-tenant functionality of the data center 10. For ease of illustration, the overlay network(s) are not shown in FIG. 1. Attached to the network fabric 15 are a plurality of endpoints 30(1), 30(2), and 30(3). In particular, the endpoints 30(1), 30(2), and 30(3) are connected to leaf nodes 20(1), 20(2), and 20(3), respectively.

The data center 10 includes a network or fabric controller 50 (e.g., Application Policy Infrastructure Controller (APIC)) that is connected to the various leaf nodes of the network fabric 15. The data center 10 also includes a compute orchestrator 52 that is connected to the endpoints 30(1)-30(3). For ease of illustration, the connections between the network controller 50 and the leaf nodes, as well as the connections between the compute orchestrator 52 and the endpoints 30(1)-30(3), have been omitted from FIG. 1.

As noted above, data center 10 is an example of a "multi-tenant" data center. That is, the data center 10 is configured to host services for different tenants (i.e., multiple different organizations, separate entities within an organization, etc. share the underlying infrastructure of data center 10). In the specific example of FIG. 1, a first tenant 35(1) and a second tenant 35(2) operate within data center 10. The first tenant 35(1) is associated with the endpoint 30(1), while the second tenant 35(2) is associated with the endpoint 30(2).

Also shown in FIG. 1 is a third tenant 35(3), which is associated with the endpoint 30(3). The third tenant 35(3) is referred to herein as an "infrastructure tenant" because it provides common/shared resources for the other tenants 35(1) and 35(2). For ease of description, endpoints 30(1) and 30(2) are referred to herein as hosts 30(1) and 30(2), while the endpoint 30(3) is referred to as a shared or infrastructure server. The infrastructure server 30(3) hosts one or more resources that, as described below, can be shared by the hosts 30(1) and 30(2).

The network fabric 15 represents a software defined network where the data center 10 is configured such that there is logical separation between each of the tenants 35(1)-35(3). That is, the tenants operate on different "sub-networks" that are specific to each tenant. These sub-networks, sometimes referred to herein as bridge domains, may be created through the use of one or more overlay networks and include logical network links that carry traffic for only the associated tenant That is, the different tenants in a software defined network are logically segregated from one another, meaning that endpoints associated with one tenant cannot directly communicate with endpoints associated with other tenants via interconnecting network devices.

For example, to facilitate segregation of the tenants 35(1), 35(2), and 35(3), the tenants each have their own associated bridge domain. In the example of FIG. 1, tenant 35(1) is associated with bridge domain "BDb," tenant 35(2) is associated with bridge domain "BDy," and tenant 35(3) is associated with bridge domain "BDg." Each bridge domain can be bound to multiple EPGs, but each EPG can only be bound to one bridge domain. In the example of FIG. 1, host 30(1) is part of an endpoint group (EPG) that is referred to as "EPG-1." EPG-1 is initially bound to BDb (i.e., the bridge domain of tenant 35(1)). Host 30(2) is part of an endpoint group that is referred to herein as "EPG-2." EPG-2 is initially bound to BDy (i.e., the bridge domain of tenant 35(2)). The infrastructure server 30(3) is part of an endpoint group that is referred to herein as "EPG-3." EPG-3 is initially bound to BDg (i.e., the bridge domain of tenant 35(3)).

Figure 2:
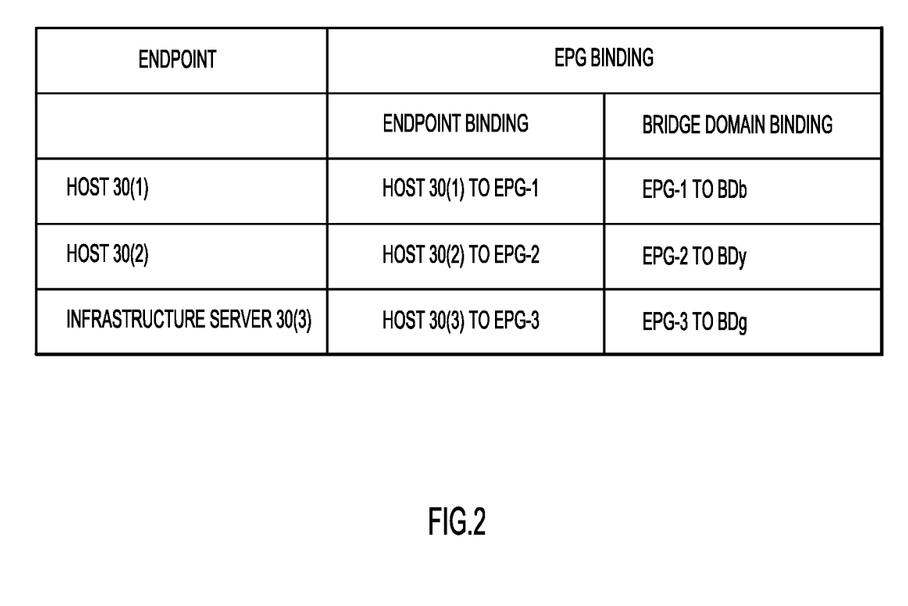
FIG. 2 is a table illustrating EPG bindings associated with an endpoint, according to an example embodiment.

FIG. 2 is a table illustrating the initial bindings associated with each of the endpoints 30(1)-30(3) in the arrangement of FIG. 1. As noted above and as shown in FIG. 2, each endpoint has an associated EPG binding that has two components, namely an EPG-to-endpoint binding (endpoint binding) and an EPG-to-bridge domain binding (bridge domain binding).

Returning to the example of FIG. 1, the EPG bindings associated with the endpoints 30(1)-30(3) are data structures stored in the leaf switches 20(1), 20(2), and 20(3), respectively. In FIG. 1, the EPG binding associated with host 30(1) is represented by reference number 40(1), the EPG binding associated with host 30(2) is represented by reference number 40(2), and the EPG binding associated with infrastructure server 30(3) is represented by reference number 40(3).

In a multi-tenant network fabric, such as network fabric 15 of FIG. 1, the traffic across tenants (cross-tenant traffic) cannot be forwarded by all leaf nodes (i.e., endpoints in different tenants cannot directly communicate with one another). Instead, special leaf nodes referred to as "border" leaf nodes, such as leaf node 20(4) in FIG. 1, have to be used to forward cross-tenant traffic between tenants. This requirement for "indirect" communication (i.e., that the cross-tenant traffic pass through the border node rather than between nodes directly interconnecting the endpoints) can make the communication across tenants costly, as the traffic may need to traverse the network fabric 15 twice between two endpoints of different tenants (i.e., first from one endpoint to the border leaf node and then from the border leaf to the other endpoint). This current mechanism for cross-tenant traffic is not scalable and presents a limitation on conventional multi-tenant network fabrics.

As such, presented herein are techniques for creating shared (public) resources in a multi-tenant network fabric, without requiring cross-tenant traffic to traverse the border leaf nodes. As used herein, traffic between endpoints of different tenants that does not traverse the border leaf nodes is referred to as "direct" cross-tenant traffic or direct cross-tenant communication. The techniques presented herein utilize dynamic EPG binding changes, including either changes to the EPG-to-endpoint binding or changes to the EPG-to-bridge domain binding, to enable direct cross-tenant traffic and facilitate cross-tenant resource sharing. As described further below, these binding changes may be triggered through traffic inspection and/or orchestration. The techniques presented herein allow on-demand efficient cross-tenant resource sharing and do not involve changes on endpoints and, as such, the techniques can be leveraged by existing endpoints.

Merely for ease of illustration, the techniques presented herein will be described with reference to facilitating access of tenants 35(1) and 35(2) to common Trivial File Transfer Protocol (TFTP)/images in the infrastructure tenant 35(3) (i.e., sharing of image servers residing in an infrastructure tenant). However, it is to be appreciated that the techniques presented herein may be used to enable different tenants to share other types of resources and the sharing of image servers is merely illustrative. For example, the techniques presented herein may also be used to enable different tenants to share video conference servers so that multiple tenants can share the same facility for public conferencing.

In modern data centers, administrators seldom install new software through media such as digital video discs (DVDs). Instead, administrators rely on Preboot eXecution Environment (PXE) booting from image servers. The PXE booting depends on a small set of industry-standard network protocols such as the Dynamic Host Configuration Protocol (DHCP) and the Trivial File Transfer Protocol (TFTP). In general, a typical PXE booting process for a host involves the following four steps:
1. The host sends a DHCP request with PXE boot options and receives a response providing a transient Internet Protocol (IP) address for the host and also the address of the TFTP/image server.
2. The host downloads an image from the TFTP/image server using the provided address.
3. The host boots up from the downloaded image.
4. The host sends another DHCP request, without PXE boot options, and receives a permanent IP address.

In a multi-tenant environment, it is costly to install separate TFTP/image servers for tenants, given that the tenants likely use the same images to complete the boot process. Instead, it would be advantageous for an infrastructure tenant to provide TFTP/image servers that can be shared among multiple tenants. To facilitate this sharing, the techniques presented herein temporarily enable direct cross-tenant communication during the image downloading, but enforce tenant isolation thereafter. The direct cross-tenant communication is temporarily enabled through the use of one or more EPG binding changes.

In a first approach, the techniques presented herein temporarily change an EPG-to-bridge domain binding (bridge domain binding) associated with a host device during the PXE booting process. For example, in the arrangement of FIG. 1, host 30(1) in tenant 35(1) needs to boot up (boot) and gain access to the infrastructure server 30(3) in tenant 35(3). Initially, the EPG for host 30(1) (i.e., EPG-1) is bound to BDb belonging to tenant 35(1). When the PXE booting for host 30(1) starts (i.e., when host device 30(1) runs a booting or boot-up application), the EPG binding 40(1) associated with host device 30(1) is changed such that EPG-1 is temporarily bound to the bridge domain for tenant 35(3) (i.e., BDg). As noted, the infrastructure server 30(3) belongs to EPG-3, which is also bound to BDg. Therefore, after the change to binding 40(1), EPG-1 and EPG-3 are both bound to the same bridge domain, BDg. As such, host 30(1) can directly download an image from the infrastructure server 30(1). Once the booting is complete, the EPG binding 40(1) associated with endpoint 30(1) is changed back to the original configuration where EPG-1 is again bound to BDb. As a result, after the image downloading, EPG-1 is again segregated from EPG-3.

In summary of this first approach, an EPG binding is temporarily changed during image downloading so that the EPG for a host is bound to an infrastructure bridge domain where the host can reach TFTP/image servers. Once downloading is completed, the EPG for the host is rebound to the original tenant bridge domain.

As noted, the above first approach utilizes dynamic changes to the EPG-to-bridge domain binding to enable direct cross-tenant communication. In accordance with a second approach, the endpoint-to-EPG binding may alternatively be changed during the booting process to enable direct cross-tenant communication. More specifically, certain SDN technologies also include the concept of a "microsegmentation." A microsegmentation EPG is an EPG that takes host attributes, such as IP address, MAC address, VNIC name, VM identifier, VM name, hypervisor identifier, VMM domain, datacenter, operating system, name, etc. into consideration. A host is part of a microsegmentation EPG when one of its attributes match the definition of the microsegmentation EPG. A microsegmentation EPG takes precedence over a regular EPG so a leaf node always first checks to see if the host is in a microsegmentation EPG before forwarding traffic associated with the host. The second approach presented herein leverages the microsegmentation capabilities by dynamically configuring a microsegmentation EPG bound to an infrastructure bridge domain which can reach shared resources.

For example, in FIG. 1, a microsegmentation EPG, referred to herein as EPG-G, is created and bound to the infrastructure tenant bridge domain (BDg). When the host 30(1) starts the PXE booting (i.e., runs a booting application), the host 30(1) is reclassified so as to belong to EPG-G (i.e., bound to the microsegmentation EPG). The reclassification can be achieved through enumerating one or more attributes of host 30(1) (e.g., the IP address or the MAC address of host 30(1)) in the microsegmentation EPG.

As noted above, the infrastructure server 30(3) is bound to BDg (i.e., the infrastructure tenant bridge domain). Therefore, after the dynamic re-binding of host 30(1) to EPG-G, both host 30(1) and infrastructure server 30(3) are bound to the same bridge domain and, as a result, host 30(1) can directly access the infrastructure server 30(3).

Once the host 30(1) completes the booting process, the host is removed from EPG-G (i.e., the microsegmentation EPG) and classified back to the original EPG (i.e., EPG-1). Host 30(1) is removed from EPG-G by removing the attribute (e.g., IP address or MAC address) of host 30(1) from the enumeration of the microsegmentation EPG.

In summary of this second approach, by enumerating an attribute of the booting host in the definition of the microsegmentation EPG, the host is bound to an infrastructure bridge domain where the host can reach TFTP/image servers. Once downloading is completed, the host is rebound to the original EPG such that the host is segregated from the infrastructure bridge domain.

As noted above, the above approaches utilize dynamic EPG binding changes to temporarily enable direct cross-tenant communication. The EPG binding changes can be triggered and achieved in several manners. First, an EPG binding change could be triggered through traffic inspection at the first-hop leaf node 20(1). In this approach, the leaf node software triggers the binding changes based on inspection of received DHCP packets. More specifically, when the leaf node 20(1) receives a DHCP packet with PXE boot options from the host 30(1), the leaf node 20(1) determines that the host 30(1) is attempting to download an image. As a result, the leaf node 20(1) changes the EPG binding 40(1), in one of the manners described above. For example, EPG-1 is bound to BDg (i.e., binds the EPG for host 30(1) to the infrastructure tenant 35(1) so that the host can reach the shared TFTP/image servers) or host 30(1) is bound to EPG-G (i.e., the booting host is dynamically bound to a microsegmentation EPG that is tied to the infrastructure bridge domain). Therefore, in the traffic inspection approach, the DHCP packet with PXE boot options is a notification indicating that the booting application has initiated operation (i.e., has started) and that the booting application needs temporary access to resources located at the infrastructure server 30(3).

After the host 30(1) downloads the image and boots up from the downloaded image, the host 30(1) sends another DHCP request without PXE boot options. When the leaf node 20(1) receives the DHCP packet without PXE boot options from the host 30(1), the leaf node 20(1) determines that the host 30(1) has completed the image download. As a result, the leaf node 20(1) changes the EPG binding 40(1), as described above, so that EPG-1 is re-bound to BDb or host 30(1) is rebound to EPG-1 from EPG-G. Therefore, in the traffic inspection approach, this DHCP request without PXE boot operations is a notification indicating that the booting application no longer needs access to the resources located at the infrastructure server 30(3).

As an alternative to traffic inspection, the EPG binding changes can be triggered by the compute orchestrator 52. As noted above, the compute orchestrator 52 is a device that controls the compute resources (i.e., endpoints 30(1)-30(3)) attached to the network fabric 15. The compute orchestrator 52 is aware when a host booting process starts and, as such, can trigger the leaf nodes to implement a change to the EPG binding associated with an endpoint. More specifically, the compute orchestrator 52 is in communication with the network controller 50 which, as noted above, controls the network fabric 15. When the compute orchestrator 52 determines that a host, such as host 30(1), is going to initiate a boot process, the compute orchestrator 52 sends a notification to the network controller 50 which indicates which host is about to boot. In response, the network controller 50 sends a notification (e.g., Representational State Transfer (REST) Application program interface (API)) to the first-hop leaf node for the booting host. As noted above, in the example of FIG. 1, host 30(1) initiates a boot process and, as a result, the network controller 50 sends a notification to leaf node 20(1) indicating that host 30(1) is about to boot.

When the leaf node 20(1) receives the notification from network controller 50 indicating that host 30(1) is going to boot, the leaf node 20(1) changes the EPG binding 40(1), in one of the manners described above. Therefore, in the orchestration approach, the notification from the network controller is a notification indicating that the booting application has initiated operation (i.e., has started) and that the booting application needs temporary access to resources located at the infrastructure server 30(3).

When the compute orchestrator 52 determines that the host 30(1) as completed the boot process, the compute orchestrator 52 sends another notification to the network controller 50 which indicates which host has completed booting. In response, the network controller 50 sends another notification to the leaf node 20(1) indicating that host 30(1) is has finished the boot process. As a result, the leaf node 20(1) changes the EPG binding 40(1), as described above, so that EPG-1 is re-bound to BDb. Therefore, in the orchestration approach, this notification from the network controller is a notification indicating that the booting application no longer needs access to the resources located at the infrastructure server 30(3).

Figure 3:
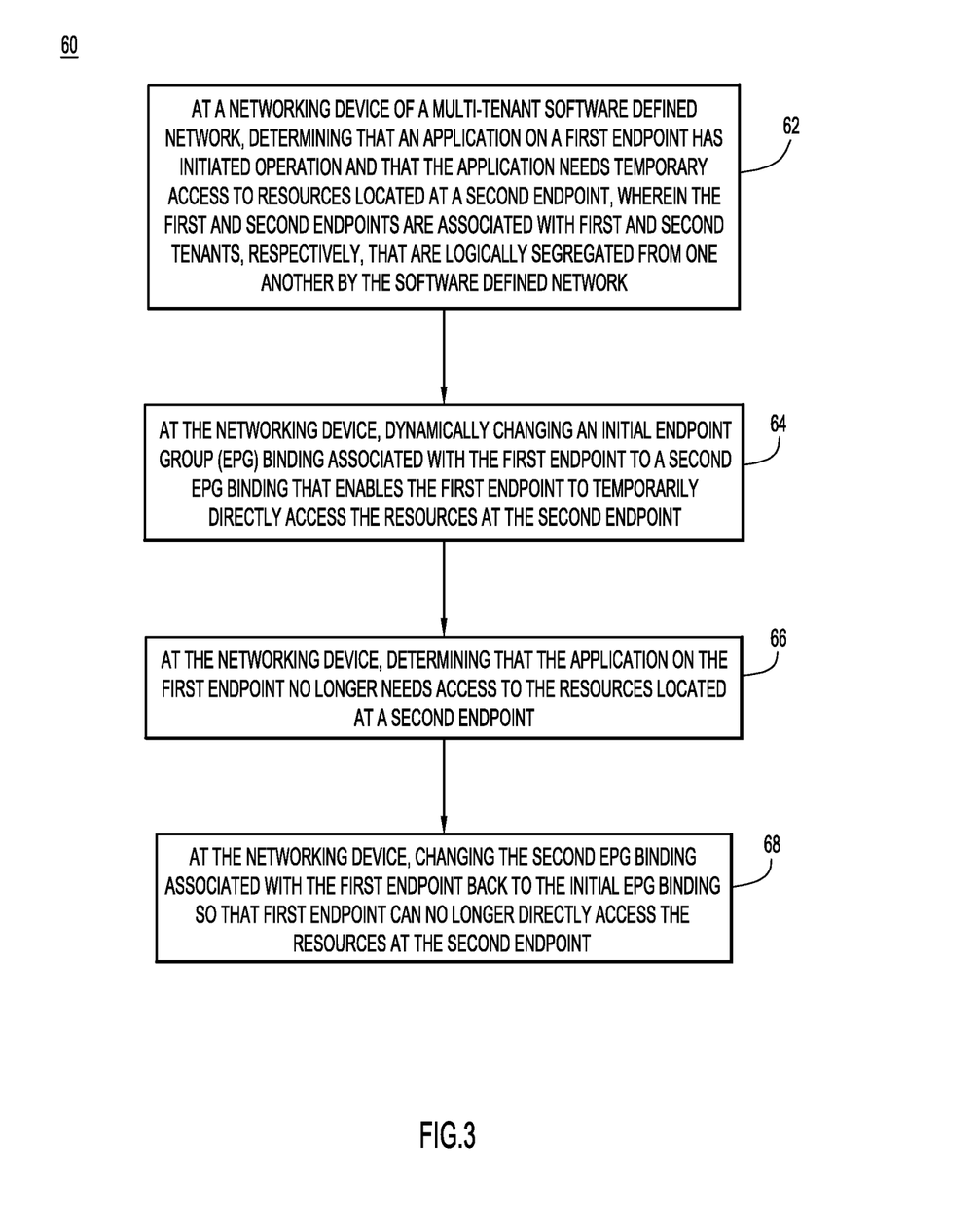
FIG. 3 is a flowchart of a method for cross-tenant resource sharing, according to an example embodiment.

FIG. 3 is a flowchart of a method 60 in accordance with embodiments presented herein. Method 60 begins at 62 where a networking device (e.g., a leaf switch) of a multi-tenant software defined network determines that an application on a first endpoint has initiated operation and that the application needs temporary access to resources located at a second endpoint. The first and second endpoints are associated with first and second tenants, respectively, that are logically segregated from one another by the software defined network. At 64, the networking device dynamically changes an initial EPG binding associated with the first endpoint to a second EPG binding that enables the first endpoint to temporarily directly access the resources at the second endpoint. At 66, the networking device determines that the application on the first endpoint no longer needs access to the resources located at a second endpoint. At 68, the networking device changes the second EPG binding associated with the first endpoint back to the initial EPG binding so that first endpoint can no longer directly access the resources at the second endpoint.

Figure 4:
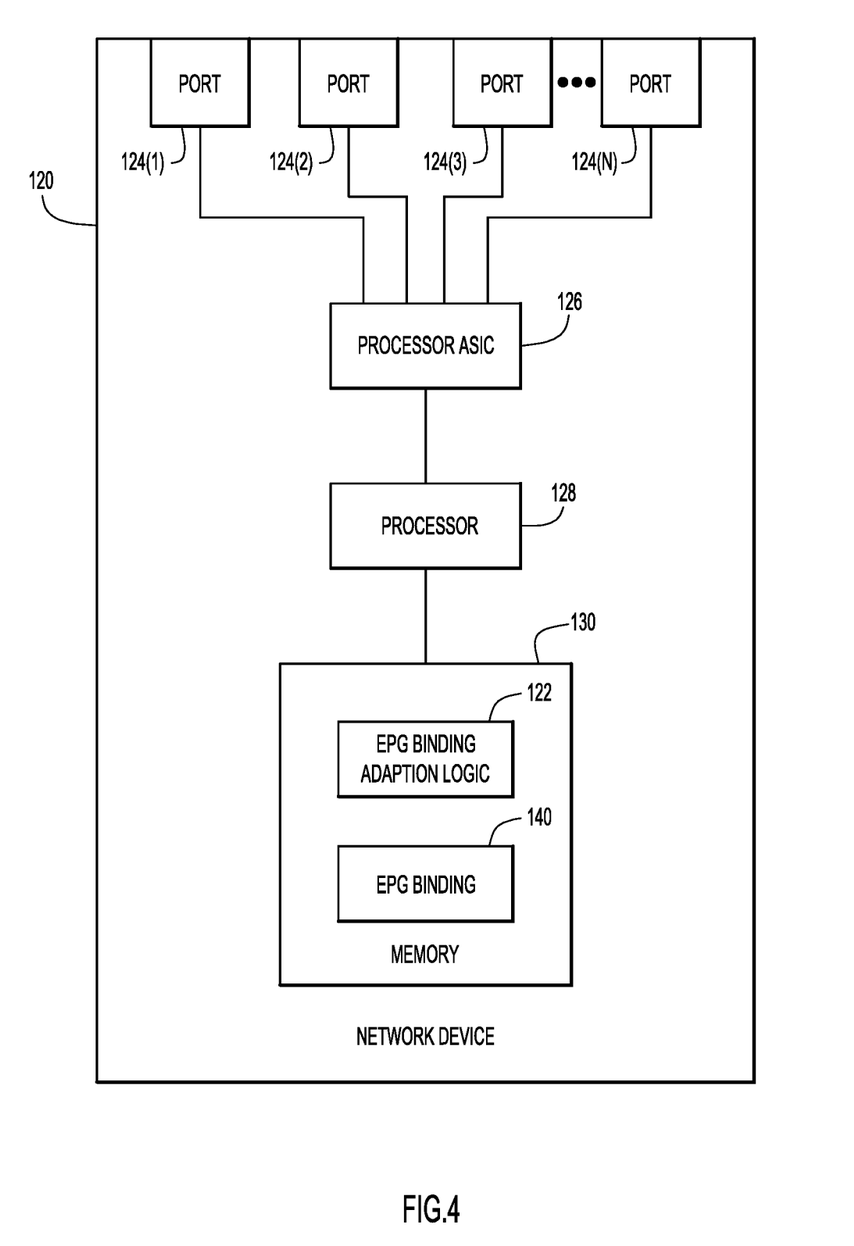
FIG. 4 is a block diagram of a networking device, according to an example embodiment.

FIG. 4 illustrates a block diagram of a networking device 120 (e.g., leaf node/switch) that is configured to participate in the techniques presented herein. The networking device 120 includes a network interface unit in the form of a plurality of network ports 124(1)-124(N), a processor Application Specific Integrated Circuit (ASIC) 126 that performs network processing functions, one or more processors 128 (e.g., microprocessors or microcontrollers), and memory 130. The memory 130 stores EPG binding adaption logic 122 and one or more EPG bindings 140 associated with an endpoint that is connected to the networking device 120. It is to be understood that, in certain examples, the network device 120 may be a virtual (software-based) appliance.

The memory 130 may include read only memory (ROM), random access memory (RAM), magnetic disk storage media devices, optical storage media devices, flash memory devices, electrical, optical, or other physical/tangible memory storage devices. Thus, in general, the memory 130 may comprise one or more tangible (non-transitory) computer readable storage media (e.g., a memory device) encoded with software comprising computer executable instructions and when the software is executed (by the one or more processors 128) it is operable to perform the operations described herein with reference to a leaf node.

As described above, presented herein are techniques for enabling endpoints associated with different tenants to temporarily share resources (e.g., image servers, conference facilities, etc.). The techniques presented herein use dynamic EPG binding changes (e.g., either changes to an EPG-to-BD binding or changes to an endpoint-to-EPG binding) to facilitate cross-tenant resource sharing. The EPG binding changes can be triggered through traffic inspection or through orchestration.

In one form, a computer implemented method is provided. The method comprises: at a networking device of a multi-tenant software defined network, determining that an application on a first endpoint has initiated operation and that the application needs temporary access to resources located at a second endpoint, wherein the first and second endpoints are associated with first and second tenants, respectively, that are logically segregated from one another by the software defined network; at the networking device, dynamically changing an initial endpoint group (EPG) binding associated with the first endpoint to a second EPG binding that enables the first endpoint to temporarily directly access the resources at the second endpoint; at the networking device, determining that the application on the first endpoint no longer needs access to the resources located at a second endpoint; and at the networking device, changing the second EPG binding associated with the first endpoint back to the initial EPG binding so that first endpoint can no longer directly access the resources at the second endpoint.

In another form, an apparatus is provided. The apparatus comprises: a memory; a network interface unit; and a processor configured to: determine that an application on a first endpoint has initiated operation and that the application needs temporary access to resources located at a second endpoint, wherein the first and second endpoints are associated with first and second tenants, respectively, of a multi-tenant software defined network that are logically segregated from one another by the software defined network; dynamically change an initial endpoint group (EPG) binding associated with the first endpoint to a second EPG binding that enables the first endpoint to temporarily directly access the resources at the second endpoint; determine that the application on the first endpoint no longer needs access to the resources located at a second endpoint; and change the second EPG binding associated with the first endpoint back to the initial EPG binding so that first endpoint can no longer directly access the resources at the second endpoint.

In another form, one or more non-transitory computer readable storage media encoded with instructions are provided. The instructions, when executed by a processor, cause the processor to: at a networking device of a multi-tenant software defined network, determine that an application on a first endpoint has initiated operation and that the application needs temporary access to resources located at a second endpoint, wherein the first and second endpoints are associated with first and second tenants, respectively, that are logically segregated from one another by the software defined network; at the networking device, dynamically change an initial endpoint group (EPG) binding associated with the first endpoint to a second EPG binding that enables the first endpoint to temporarily directly access the resources at the second endpoint; at the networking device, determine that the application on the first endpoint no longer needs access to the resources located at a second endpoint; and at the networking device, change the second EPG binding associated with the first endpoint back to the initial EPG binding so that first endpoint can no longer directly access the resources at the second endpoint.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims. In particular, any specific implementation details described using REST APIs may be implemented using any protocol that carries information between network elements.

What is claimed is:

1. A method comprising:
   at a networking device of a multi-tenant software defined network:
   determining that an application on a first endpoint has initiated operation and that the application needs temporary access to resources located at a second endpoint, wherein the first and second endpoints are associated with first and second tenants, respectively, that are logically segregated from one another by the multi-tenant software defined network;
   dynamically changing an initial endpoint group (EPG) binding associated with the first endpoint to a second EPG binding that enables the first endpoint to temporarily directly access the resources at the second endpoint;
   based on the second EPG binding, allowing the application on the first endpoint to directly access the resources at the second endpoint;
   determining that the application on the first endpoint no longer needs access to the resources located at the second endpoint; and
   changing the second EPG binding associated with the first endpoint back to the initial EPG binding so that the first endpoint can no longer directly access the resources at the second endpoint,
   wherein dynamically changing the initial EPG binding associated with the first endpoint to the second EPG binding comprises:
   dynamically changing an endpoint-to-EPG binding associated with the first endpoint, wherein in the second EPG binding the first endpoint is part of a microsegmentation EPG that is bound to a bridge domain associated with the second tenant.

2. The method of claim 1, wherein dynamically changing the initial EPG binding associated with the first endpoint to the second EPG binding includes:
   dynamically changing an EPG-to-bridge domain binding associated with the first endpoint, wherein in the second EPG binding the first endpoint and the second endpoint are each associated with different EPGs that are bound to the same bridge domain.

3. The method of claim 1, wherein determining that the application on the first endpoint has initiated operation and that the application needs temporary access to resources located at the second endpoint comprises:
   inspecting a traffic packet received from the first endpoint indicating that the application has initiated operation.

4. The method of claim 1, wherein determining that the application on the first endpoint has initiated operation and that the application needs temporary access to resources located at the second endpoint comprises:
   receiving a notification indicating that the application has initiated operation, wherein the notification is generated based on information received from a compute orchestrator controlling the first endpoint.

5. The method of claim 1, wherein the application is a booting application.

6. The method of claim 1, wherein the second EPG binding enables the first endpoint to send traffic to the second endpoint without requiring the traffic to traverse a border node of the multi-tenant software defined network.

7. The method of claim 1, wherein the multi-tenant software defined network has a leaf and spine architecture, and wherein the networking device is leaf switch.

8. An apparatus comprising:
   a memory;
   a network interface unit; and
   a processor configured to:
   determine that an application on a first endpoint has initiated operation and that the application needs temporary access to resources located at a second endpoint, wherein the first and second endpoints are associated with first and second tenants, respectively, of a multi-tenant software defined network that are logically segregated from one another by the multi-tenant software defined network;
dynamically change an initial endpoint group (EPG) binding associated with the first endpoint to a second EPG binding that enables the first endpoint to temporarily directly access the resources at the second endpoint;
based on the second EPG binding, allow the application on the first endpoint to directly access the resources at the second endpoint;
determine that the application on the first endpoint no longer needs access to the resources located at the second endpoint; and
change the second EPG binding associated with the first endpoint back to the initial EPG binding so that the first endpoint can no longer directly access the resources at the second endpoint,
wherein to dynamically change the initial EPG binding associated with the first endpoint to the second EPG binding, the processor is configured to:
dynamically change an endpoint-to-EPG binding associated with the first endpoint, wherein in the second EPG binding the first endpoint is part of a microsegmentation EPG that is bound to a bridge domain associated with the second tenant.

9. The apparatus of claim 8, wherein to dynamically change the initial EPG binding associated with the first endpoint to the second EPG binding, the processor is further configured to:
dynamically change an EPG-to-bridge domain binding associated with the first endpoint, wherein in the second EPG binding the first endpoint and the second endpoint are each associated with different EPGs that are bound to the same bridge domain.

10. The apparatus of claim 8, wherein to determine that the application on the first endpoint has initiated operation and that the application needs temporary access to resources located at the second endpoint, the processor is configured to:
inspect a traffic packet received from the first endpoint indicating that the application has initiated operation.

11. The apparatus of claim 8, wherein to determine that the application on the first endpoint has initiated operation and that the application needs temporary access to resources located at the second endpoint, the processor is configured to:
receive a notification indicating that the application has initiated operation, wherein the notification is generated based on information received from a compute orchestrator controlling the first endpoint.

12. The apparatus of claim 8, wherein the application is a booting application.

13. The apparatus of claim 8, wherein the second EPG binding enables the first endpoint to send traffic to the second endpoint without requiring the traffic to traverse a border node of the multi-tenant software defined network.

14. The apparatus of claim 8, wherein the apparatus is a leaf switch in a leaf and spine architecture.

15. One or more non-transitory computer readable storage media encoded with instructions that, when executed by a processor, cause the processor to:
at a networking device of a multi-tenant software defined network:
determine that an application on a first endpoint has initiated operation and that the application needs temporary access to resources located at a second endpoint, wherein the first and second endpoints are associated with first and second tenants, respectively, that are logically segregated from one another by the multi-tenant software defined network;
dynamically change an initial endpoint group (EPG) binding associated with the first endpoint to a second EPG binding that enables the first endpoint to temporarily directly access the resources at the second endpoint;
determine that the application on the first endpoint no longer needs access to the resources located at the second endpoint; and
change the second EPG binding associated with the first endpoint back to the initial EPG binding so that the first endpoint can no longer directly access the resources at the second endpoint,
wherein the instructions operable to dynamically change the initial EPG binding associated with the first endpoint to the second EPG binding comprise instructions operable to:
dynamically change an endpoint-to-EPG binding associated with the first endpoint, wherein in the second EPG binding the first endpoint is part of a microsegmentation EPG that is bound to a bridge domain associated with the second tenant.

16. The non-transitory computer readable storage media of claim 15, wherein the instructions operable to dynamically change the initial EPG binding associated with the first endpoint to the second EPG binding include instructions to:
dynamically change an EPG-to-bridge domain binding associated with the first endpoint, wherein in the second EPG binding the first endpoint and the second endpoint are each associated with different EPGs that are bound to the same bridge domain.

17. The non-transitory computer readable storage media of claim 15, wherein the instructions operable to determine that the application on the first endpoint has initiated operation and that the application needs temporary access to resources located at the second endpoint comprise instructions to:
inspecting an in-band packet received from the first endpoint indicating that the application has initiated operation.

18. The non-transitory computer readable storage media of claim 15, wherein determining that the application on the first endpoint has initiated operation and that the application needs temporary access to resources located at the second endpoint comprise instructions to:
receive a notification indicating that the application has initiated operation, wherein the notification is generated based on information received from a compute orchestrator controlling the first endpoint.

19. The non-transitory computer readable storage media of claim 15, wherein the application is a booting application.

20. The transitory computer readable storage media of claim 15, wherein the second EPG binding enables the first endpoint to send traffic to the second endpoint without requiring the traffic to traverse a border node of the multi-tenant software defined network.

* * * * *